(12) United States Patent
Levine et al.

(10) Patent No.: US 8,949,134 B2
(45) Date of Patent: Feb. 3, 2015

(54) METHOD AND APPARATUS FOR RECORDING/REPLAYING APPLICATION EXECUTION WITH RECORDED VOICE RECOGNITION UTTERANCES

(75) Inventors: Jacob Levine, Port Jefferson Station, NY (US); John Muller, Oakdale, NY (US); Christopher Passaretti, Smithtown, NY (US); Wu Chingfa, Nesconset, NY (US)

(73) Assignee: Avaya Inc., Basking Ridge, NJ (US)

( * ) Notice: Subject to any disclaimer, the term of this patent is extended or adjusted under 35 U.S.C. 154(b) by 1706 days.

(21) Appl. No.: 10/939,644

(22) Filed: Sep. 13, 2004

(65) Prior Publication Data

US 2006/0069568 A1    Mar. 30, 2006

(51) Int. Cl.
  *G10L 21/06*    (2013.01)
  *G10L 15/01*    (2013.01)

(52) U.S. Cl.
  CPC .................................... *G10L 15/01* (2013.01)
  USPC ........... 704/276; 704/231; 704/235; 704/251; 704/270

(58) Field of Classification Search
  CPC ......... G10L 15/00; G10L 15/01; G10L 15/20; G10L 15/22; G10L 15/222; G10L 15/26; G10L 15/265; G10L 2015/0022

USPC .......................... 704/276, 231, 270, 235, 251
See application file for complete search history.

(56) References Cited

U.S. PATENT DOCUMENTS

| 6,999,930 | B1 * | 2/2006 | Roberts et al. | 704/270.1 |
| 7,003,079 | B1 * | 2/2006 | McCarthy et al. | 379/32.01 |
| 2003/0235282 | A1 * | 12/2003 | Sichelman et al. | 379/201.03 |
| 2004/0162724 | A1 * | 8/2004 | Hill et al. | 704/231 |
| 2005/0105712 | A1 * | 5/2005 | Williams et al. | 379/265.02 |
| 2006/0050658 | A1 * | 3/2006 | Shaffer et al. | 370/261 |

* cited by examiner

*Primary Examiner* — Qi Han
(74) *Attorney, Agent, or Firm* — Maldjian Law Group LLC; John Maldjian; Alexander D. Walter

(57) ABSTRACT

A diagnostic tool for speech recognition applications is provided, which enables a administrator to collect multiple recorded speech sessions. The administrator can then search for various failure points common to one or more of the recorded sessions in order to get a list of all sessions that have the same failure points. The invention allows the administrator to playback the session or replay any portion of the session to see the flow of the application and the recorded utterances. The invention provides the administrator with information about how to maximize the efficiency of the application which enables the administrator to edit the application to avoid future failure points.

53 Claims, 3 Drawing Sheets

Scenario 1

Application:

"Would you like a smoking or non-smoking room?"

User:

"smoking"

Scenario 2

Application:

"Would you like a smoking or non-smoking room?"

User:

"non smoking"

Scenario 3

Application:

"Would you like a smoking or non-smoking room?"

User:

"non"

Figure 1

METHOD AND APPARATUS FOR RECORDING/REPLAYING APPLICATION EXECUTION WITH RECORDED VOICE RECOGNITION UTTERANCES

FIELD OF THE INVENTION

The present invention relates generally to speech recognition software and more particularly to a diagnostic tool that enables collection of multiple recorded speech sessions and search capabilities for various failure points common to one or more of the recorded sessions. The diagnostic tool provides information to the administrator that enables the administrator to edit the application to avoid future failure points.

BACKGROUND OF THE INVENTION

Interactive Voice Response (IVR) is a software application that accepts a combination of voice telephone input and touch-tone keypad selection and provides appropriate responses in the form of voice, fax, callback, e-mail and perhaps other media. The quickening pace of adoption of speech solutions in the IVR industry is currently driven by improvements in speech algorithms, natural language processing, vocabulary management, and language modeling.

IVR and transaction-processing applications allow self-service access to automated banking, stock portfolios, account information, airline schedules, movie times, etc. Callers may also place orders, track order status, or use a directory to contact a department or individual. Automated speech recognition enhances the flexibility and power of IVR applications.

A speech recognition system typically includes an input device, a voice board that provides analog-to-digital conversion of a speech signal, and a signal processing module that takes the digitized samples and converts them into a series of patterns. These patterns are then compared to a set of stored models that have been constructed from the knowledge of acoustics, language, and dictionaries. The technology may be speaker dependent (trained), speaker adaptive (improves with use), or fully speaker independent. In addition, features such as "barge-in" capability, which allows the user to speak at anytime, and key word spotting, which makes it possible to pick out key words from among a sentence of extraneous words, enable the development of more advanced applications.

The main goal of speech recognition applications is to mimic human listeners. When a human listener hears a word sequence, he/she automatically attributes a confidence level to the utterance; for example, when the noise level is high, the probability of confusion is high and a human listener will probably ask for a repeat of the utterance. Accordingly, the confidence level is used to make further decisions on a recognized sequence. The "confidence level" obtained from the confidence measure is then used for various validations of the speech recognition results.

The functionalities that can be delivered by today's IVR speech solutions vary widely and range from recognition of spoken letters and numbers to more complex phrases and sentences. Some applications simply replace touch-tone interfaces with speech-enabled applications that recognize a very limited set of spoken letters and numbers that primarily represent the touch keypad. More advanced applications employ directed dialogue or system prompts that guide users to respond with fairly simple spoken words that can be accurately recognized. The most advanced natural language applications enable recognition of more complex phrases and sentences spoken in a conversational manner at a natural speed.

Speech solutions are now enabling the development of IVR applications that go beyond rigid touch-tone interface models to exploit the navigational flexibility offered by natural language processing. Natural language recognition and advanced user interfaces that conduct interactive dialogues with users in order to complete transactions are driving the creation of the most versatile and robust applications ever developed for the IVR industry.

The main factor driving the emergence of speech as the IVR user interface are increasing labor costs. The cost of employing live customer service agents is rising at the same time that organizations are facing increased pressure to reduce the cost of serving customers. When an automated call-processing solution is employed, a speech-enabled IVR application increases caller acceptance because it provides the friendliest and fastest self-service alternative to speaking with a customer service agent. Speech solutions also create new opportunities to automate transactions that are too cumbersome to complete using a DTMF interface, such as bill payment or stock trading. Higher call volumes make the addition of speech recognition more cost-effective. Speech solutions provide the potential for dramatic reductions in operational costs. Speech solutions improve the productivity of customer service personnel because a higher percentage of customer calls can be fully or partially automated. Increased automation frees the customer service agent from many routine administrative tasks and reduces costs related to customer service staffing, as fewer agents are able to serve more customers.

However, in order to maintain the cost savings provided by speech solution applications the caller must remain in the automated call processing transaction. When a caller opts-out of the automated system to talk to a live operator there is an associated charge to the company. The opt-out rate is the percentage of callers who opt to talk to a live agent.

One of the reasons a caller might choose to speak to a live agent is because of a rejection error by the IVR system. A rejection error occurs when a spoken word or phrase is not recognized or is recognized incorrectly by the system. A caller can select to opt-out verbally or by using a push button. The caller might also be timed out of the application and be automatically opted-out after no-speech is received. No-speech occurs when the user did not speak anything while the recognizer was waiting for speech. Some additional reasons a caller might opt-out of the automated system could include the instructions are not clear, the speech recognizer is not recognizing some unexpected spoken utterances, the application flow is cumbersome and the caller gets frustrated and opts out or the caller is unable to find the desired feature.

Conventional speech recognition applications only save the recognition audio. As such, it is difficult to determine where in the application a problem occurs. Currently, this determination can only be done, if at all, with some type of logging facility. However, it is difficult and cumbersome to review logging to determine where an error occurred. Also, if an application does not have the required logging there is no way to recreate the scenario where a problem occurred.

To optimize a speech application there exists a need for a diagnostic tool which enables an administrator to save an application execution of one or more sessions and compare opt-outs for a better understanding of how the application is operating.

BRIEF SUMMARY OF THE INVENTION

The present invention provides apparatus and methods for analyzing voice recognition results and application flow in speech recognition applications. The invention provides the ability to tap into a line and record a session then compare sessions to see why poor retention results are being generated.

An aspect of the invention provides a method of increasing an efficiency of a speech recognition application. The method includes recording on a storage device multiple sessions with a speech recognition application and determining if the recorded sessions include a common failure. The method further includes grouping the recorded sessions determined to have the common attribute and providing access to at least 2 of the grouped recorded sessions for review.

Another aspect of the invention provides a method of increasing an efficiency of a speech recognition application. The method includes recording on a storage device multiple sessions with a speech recognition application that contain a common attribute and grouping the recorded sessions. The method further includes providing access to at least 2 of the grouped recorded sessions for review.

Yet another aspect of the invention provides a diagnostic tool to increase an efficiency of a speech recognition application. The diagnostic tool includes a recording module for recording on a storage device multiple sessions within a speech recognition application and a diagnostic module in communication with the recording module for determining if the recorded sessions contain a common attribute. The diagnostic tool further includes a grouping module in communication with the diagnostic module for grouping the recorded sessions determined to have the common attribute. The diagnostic tool also includes an access module in communication with the grouping module for providing access to at least 2 of the grouped recorded sessions for review.

Still another aspect of the invention provides a diagnostic tool to increase an efficiency of a speech recognition application. The diagnostic tool includes a recording module for recording on a storage device multiple sessions with a speech recognition application that contain a common attribute and a grouping module in communication with the diagnostic module for grouping the recorded sessions. The diagnostic tool further provides an access module in communication with the grouping module for providing access to at least 2 of the recorded sessions for review.

BRIEF DESCRIPTION OF THE DRAWINGS

The invention will be described in more detail below with the reference to an embodiment to which, however, the invention is not limited.

FIG. 1 illustrates a sample speech recognition dialog.

DETAILED DESCRIPTION OF THE DRAWINGS

Figure 2:
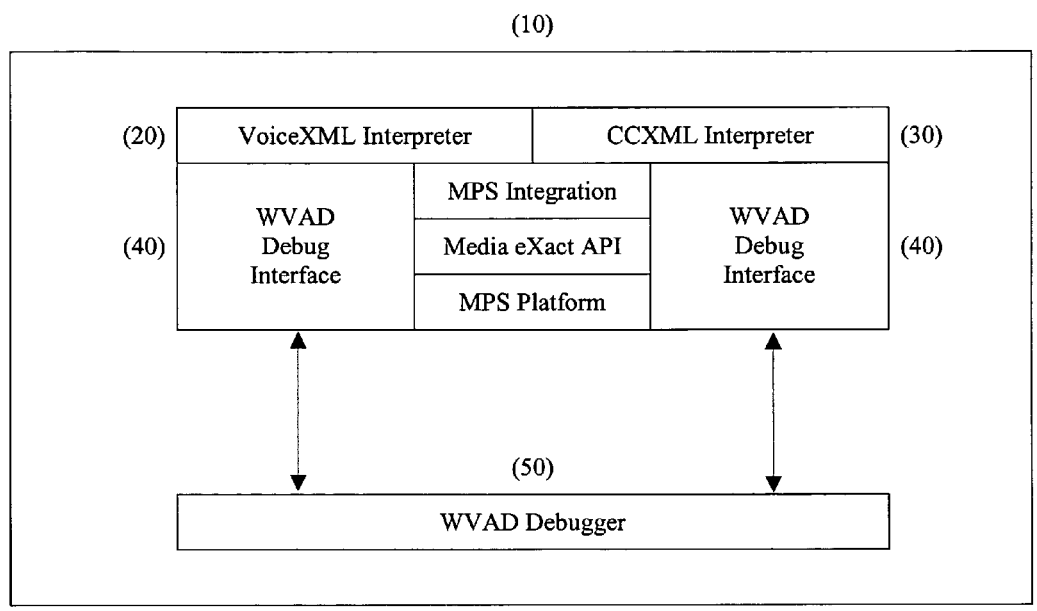
FIG. 2 illustrates an embodiment of the present invention using the WVAD Suite implementation.

In order to minimize expenses, a speech application may be analyzed and tuned. The analysis and tuning enables the application to be corrected in areas that consistently cause callers to opt-out. This keeps the application robust and increases completion rates of callers in speech recognition applications.

The present invention provides the ability to record one or more sessions (calls) with an application and filter out sessions with common failure points for review. The application flow as well as the recorded utterances are saved. Application flow lists the steps an application goes through as it executes in time. Those skilled in the art will recognize that they can be saved together or separately. The user can then search for and play back any of these recorded sessions. The playback may show the application flow as it executes as well as the recorded prompts. Those skilled in the art will recognize that the prompts can be selectively omitted and still fall within the scope of the invention.

The present invention provides the user with the ability to see the path the session is taking and determine why that path was taken. This in turn enables more efficient and more advanced analysis which leads to a lower overall opt-out rate.

A sample application is illustrated in FIG. 1. The application prompts for spoken input from the caller. The original application may not have been very robust and for example only recognizes the phrases "smoking" or "non smoking" (as shown in scenario 1 and scenario 2). This application results in a high opt-out rate. An opt-out rate is the number of callers who opted to talk to a live agent. An analysis and tuning cycle would reveal that some callers spoke "non" rather then "non smoking" (as shown in scenario 3). The application could thus be adjusted to recognize the word "non" as well as "non smoking." This adjustment would decrease the opt-out rate, increase overall caller satisfaction and lower costs. Those skilled in the art will recognize that FIG. 1 and the description provided is merely exemplary and various applications could be employed.

During typical operation, a large number of callers for an IVR system might be opting out for the operator. The present invention would enable one or more sessions to be recorded, and then filtered for common opt-out points. The resulting recordings could then be played back and reviewed. This will allow the administrator to see when and why the callers are choosing to speak to an operator as opposed to using the automated system.

The following example provides a sample application analysis according to the present invention. An administrator recognizes that a particular application has higher then normal referral rates and enables the wire tapping feature on one or more lines. After multiple sessions are recorded the administrator disables the wire tapping feature. The administrator then searches through the sessions to determine which session had a referral (common or any) (opt-out). The administrator then reviews the session with the referral (opt-out) to determine why the call was referred. Reviewing the session may include stepping through the application and listening to the utterances spoken by the caller. Stepping through the application involves scrolling through the text of the application on a display. After the administrator determines the cause of the higher then normal referral rates appropriate adjustments may be made to the application to maximize performance. Alternatively it could be determined that the application should remain unchanged.

The present invention provides the administrator with the ability to search the application flow for given failure points and determine where tuning is required. For example the administrator may be able to search for all inputs where the rejection rate was 20% or higher. The search criteria and rate are mere design choices and any common criteria or percentage could be chosen depending of a particular application. The invention may then be employed to display the sessions that meet the given criteria. The administrator can playback the session to see the cause of the given criteria.

In an embodiment of the invention, the administrator could request a self analysis and the invention could record multiple sessions and then search for inputs that, for example, had predetermined rejection rates and/or no-speech rates and/or opt-out rates. Those skilled in the art will recognize that various parameters may be employed for filtering the documents to be reviewed.

The present invention may also have the ability to shut off voice recordings during confidential utterances. This may be preset based on questions asked in the application and can be used for utterances like credit card or social security numbers.

The invention will next be described as used in the main embodiment using a complete development, testing, and implementation environment called the Web-Centric Voice Applications Development Suite (WVAD Suite) produced by Nortel Networks Limited.

FIG. 2 provides a block diagram of the present invention. The WVAD Suite of tools (10) communicates with a Debug Interface (40) embedded in both a Voice eXtensible Markup Language (VoiceXML) (20) interpreter and a Call Control eXtensible Markup Language (CCXML) interpreter (30) as shown in FIG. 2. VoiceXML and CCXML are standards developed by the World Wide Web Consortium (W3C) as extensible markup language (XML) dialects for the creation of voice applications in a Web-based environment. The W3C develops interoperable technologies (specifications, guidelines, software, and tools) to lead the Web to its full potential. VoiceXML is a platform independent structured language created using the XML specification to deliver voice content through several different media like the web and phone system. VoiceXML enables Web-based applications to communicate with voice processing systems and to extend IVR and advanced speech applications into a browser that gives users access to Web-based information via any voice-capable device, such as a telephone. CCXML is a software language which allows developers to program telephone switches and computer telephone devices. CCXML works with—and complements—Voice XML to offer greater call control. Applications using CCXML can seamlessly transfer calls, establish conference calls, or monitor incoming calls involving an "unplanned event" such as a request for specific information.

At the start of each new session (call), the callid is passed in a message to the WVAD (10). The callid is a unique alpha/numeric identification number of a call. As the application executes, messages are sent to the WVAD (10) describing the occurrences in the application. The WVAD debugger (50) then saves these events in its replay folder. The callid is then passed to the utterance recorder. When a user speaks, the callid is automatically associated with the utterance.

After the administrator decides enough sessions have been saved, he can then begin the analysis. Alternatively, the number of sessions could be predetermined. WVAD (10) will then search the replay folder to filter the sessions and retrieve recordings from the utterance recorded.

Figure 3:
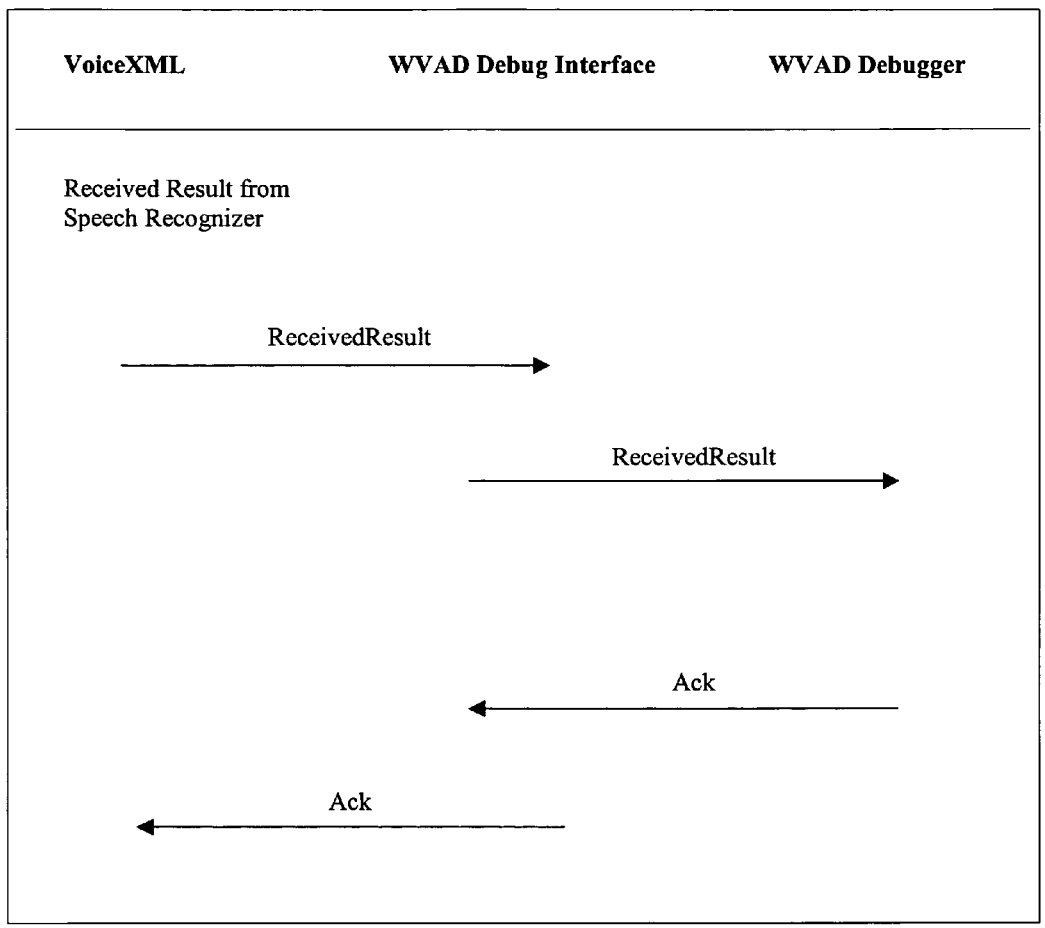
FIG. 3 illustrates WVAD message processing for Received Result.

A Received Result occurs when a Speech Recognition result is sent to the VoiceXML interpreter (20). Accordingly with reference to FIG. 2 and FIG. 3 (which illustrates a WVAD message processing for a Received Result) the WVAD Debug Interface (40) forwards this event to the WVAD debugger (50). A WVAD debugger (50) then notifies the user that a Received Result event occurred. An acknowledgement ("Ack" in FIG. 3), is then sent from the WVAD debugger to the WVAD Debug Interface.

Other embodiments of the invention may include computer systems to operate the methods and/or application according to the invention. The invention may be provided on a stand alone computer or on a server accessible by a LAN, WAN or other networks.

While the foregoing specification illustrates and describes preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method of increasing an efficiency of a speech recognition application comprising:
   receiving, by a speech recognition application, a call identification (CallID) associated with a respective one of a plurality of sessions;
   recording, on a storage device: said session of the plurality of sessions, and the CallID of said session;
   shutting off a recording of said session during time when confidential information is expected to be received;
   detecting, by the speech recognition application, an event, wherein the event comprises a communication failure of one session of said plurality of sessions;
   determining, by the speech recognition application, that a quantity of detected events that share a common attribute exceeds a predetermined threshold;
   grouping said recorded sessions determined to have said common attribute; and
   providing access to at least two of said grouped recorded sessions for review.

2. A method according to claim 1, wherein a recorded session includes an application flow and a recorded utterance.

3. A method according to claim 2 wherein the recorded utterance is muted during a confidential session.

4. A method according to claim 1, further including playing back said recorded session, wherein playing back said recorded session includes displaying the application flow as said application executes.

5. A method according to claim 4, wherein playing back said recorded session further includes displaying at least one recorded prompt.

6. A method according to claim 4 further comprising:
   determining a cause for speech sessions containing said common attribute; and editing the application to remove the cause of said attribute.

7. A method according to claim 1 wherein said common attribute is a rejection.

8. A method according to claim 1 wherein said common attribute is an opt-out of the application.

9. A method according to claim 8 wherein said opt-out was a result of no-speech.

10. A method according to claim 1, wherein said recording is performed with a wire tap.

11. A method according to claim 1, further including:
    receiving a request to perform a self-analysis; and
    in response to the request to perform a self-analysis:
        recording multiple sessions; and
        searching the recorded sessions for inputs that exceed a predetermined criterion.

12. A method of increasing an efficiency of a speech recognition application comprising:
    receiving, by a speech recognition application, a call identification (CallID) associated with a respective one of a plurality of sessions that contain a common attribute;
    recording, on a storage device: said session of the plurality of sessions, and the CallID of said session;
    shutting off a recording of said session during time when confidential information is expected to be received;
    detecting, by the speech recognition application, an event, wherein the event comprises a communication failure of one session of said plurality of sessions;

determining, by the speech recognition application, that a quantity of detected events that share a common attribute exceeds a predetermined threshold;
grouping said recorded sessions determined to have said common attribute; and
providing access to at least two of said grouped recorded sessions for review.

13. A method according to claim 12, wherein a recorded session includes an application flow and a recorded utterance.

14. A method according to claim 13 wherein the recorded utterance is muted during a confidential session.

15. A method according to claim 12, further including playing back said recorded session, wherein playing back said recorded session includes displaying the application flow as said application executes.

16. A method according to claim 15, wherein playing back said recorded session further includes displaying at least one recorded prompt.

17. A method according to claim 15 further comprising:
determining a cause for speech sessions containing said common attribute; and
editing the application to remove the cause of said attribute.

18. A method according to claim 12 wherein said common attribute is a rejection.

19. A method according to claim 12 wherein said common attribute is an opt-out of the application.

20. A method according to claim 19 wherein said opt-out was a result of no-speech.

21. A method according to claim 12, wherein said recording is performed with a wire tap.

22. A method according to claim 12, further including:
receiving a request to perform a self-analysis; and
in response to the request to perform a self-analysis:
recording multiple sessions; and
searching the recorded sessions for inputs that exceed a predetermined criterion.

23. A diagnostic tool to increase an efficiency of a speech recognition application comprising:
receiving means for receiving a call identification (CallID) associated with a respective one of a plurality of sessions;
recording means for recording, on a storage device:
said session of the plurality of sessions, and the CallID of said session;
control means for shutting off a recording of said session during time when confidential information is expected to be received;
detecting means for detecting an event, wherein the event comprises a communication failure of one session of said plurality of sessions;
determining means for determining that a quantity of detected events that share a common attribute exceeds a predetermined threshold, wherein the common attribute comprises a communication failure indicator of the recorded sessions;
grouping means in communication with the diagnostic means for grouping said recorded sessions determined to have said common attribute; and
access means in communication with the grouping means for providing access to at least two of said grouped recorded sessions for review.

24. A diagnostic tool according to claim 23, wherein a recorded session includes an application flow and a recorded utterance.

25. A diagnostic tool according to claim 24 wherein the recorded utterance is muted during a confidential session.

26. A diagnostic tool according to claim 23, further including a means for playing back said recorded session, wherein playing back said recorded session includes a display means for displaying the application flow as said application executes.

27. A diagnostic tool according to claim 26, wherein playing back said recorded session further includes a display means for displaying at least one recorded prompt.

28. A diagnostic tool according to claim 23 wherein said common attribute is a rejection.

29. A diagnostic tool according to claim 23 wherein said common attribute is an opt-out of the application.

30. A diagnostic tool according to claim 29 wherein said opt-out was a result of no-speech.

31. A diagnostic tool according to claim 23, wherein said recording means includes a wire tap.

32. A diagnostic tool according to claim 23 further comprising: diagnostic means for determining a cause for speech sessions containing said common attribute; and editing means for editing the application to remove the cause of said attribute.

33. A diagnostic tool according to claim 23, further including:
receiving means for receiving a request to perform a self-analysis; and recording means for recording multiple sessions in response to the request to perform a self-analysis; and
searching means for searching the recorded sessions for inputs that exceed a predetermined criterion.

34. A diagnostic tool to increase an efficiency of a speech recognition application comprising:
receiving means for receiving a call identification (CallID) associated with a respective one of a plurality of sessions that contain a common attribute;
recording means for recording, on a storage device:
said session of the plurality of sessions, and the CallID of said session;
control means for shutting off a recording of said session during time when confidential information is expected to be received;
detecting means for detecting an event, wherein the event comprises a communication failure of one session of said plurality of sessions;
determining means for determining that a quantity of detected events that share a common attribute exceeds a predetermined threshold, wherein the common attribute comprises a communication failure indicator of the recorded sessions;
grouping means in communication with the diagnostic means for grouping said recorded sessions determined to have said common attribute; and
access means in communication with the grouping means for providing access to at least two of said grouped recorded sessions for review.

35. A diagnostic tool according to claim 34, wherein a recorded session includes an application flow and a recorded utterance.

36. A diagnostic tool according to claim 35 wherein the recorded utterance is muted during a confidential session.

37. A diagnostic tool according to claim 34, further including a means for playing back said recorded session, wherein playing back said recorded session includes a display means for displaying the application flow as said application executes.

38. A diagnostic tool according to claim 37, wherein playing back said recorded session further includes a display means for displaying at least one recorded prompt.

39. A diagnostic tool according to claim 34 wherein said common attribute is a rejection.

40. A diagnostic tool according to claim 34 wherein said common attribute is an opt-out of the application.

41. A diagnostic tool according to claim 40 wherein said opt-out was a result of no-speech.

42. A diagnostic tool according to claim 34, wherein said recording means includes a wire tap.

43. A diagnostic tool according to claim 34 further comprising:
   diagnostic means for determining a cause for speech sessions containing said common attribute; and editing means for editing the application to remove the cause of said attribute.

44. A diagnostic tool according to claim 34, further including:
   receiving means for receiving a request to perform a self-analysis; and
   recording means for recording multiple sessions in response to the request to perform a self-analysis; and
   searching means for searching the recorded sessions for inputs that exceed a predetermined criterion.

45. A diagnostic tool to increase an efficiency of a speech recognition application comprising:
   receiving module for receiving a call identification (CallID) associated with a respective one of a plurality of sessions;
   recording module for recording, on a storage device: said session of the plurality of sessions, and the CallID of said session;
   control module for shutting off a recording of said session during time when confidential information is expected to be received;
   detecting module for detecting an event, wherein the event comprises a communication failure of one session of said plurality of sessions;
   determining module for determining that a quantity of detected events that share a common attribute exceeds a predetermined threshold, wherein the common attribute comprises a communication failure indicator of the recorded sessions;
   grouping module in communication with the diagnostic module for grouping said recorded sessions determined to have said common attribute; and
   access module in communication with the grouping module for providing access to at least two of said grouped recorded sessions for review.

46. A diagnostic tool according to claim 45, further including a module for playing back said recorded session, wherein playing back said recorded session includes a display module for displaying the application flow as said application executes.

47. A diagnostic tool according to claim 46, wherein playing back said recorded session further includes a display module for displaying at least one recorded prompt.

48. A diagnostic tool according to claim 45 wherein said common attribute is a rejection.

49. A diagnostic tool according to claim 45 wherein said common attribute is an opt-out of the application.

50. A diagnostic tool according to claim 45 wherein said opt-out was a result of no-speech.

51. A diagnostic tool according to claim 45, wherein said recording module includes a wire tap.

52. A diagnostic tool according to claim 45 further comprising: diagnostic module for determining a cause for speech sessions containing said common attribute; and editing module for editing the application to remove the cause of said attribute.

53. A diagnostic tool according to claim 45, further including: a receiver to receive a request to perform a self-analysis; and
   a recorder in communication with the receiver to record multiple sessions in response to the request to perform a self-analysis; and
   a processor to access the recorded multiple sessions, the processor configured to search the recorded sessions for inputs that exceed a predetermined criterion.

* * * * *